(12) United States Patent
McDuff

(10) Patent No.: US 8,573,913 B2
(45) Date of Patent: *Nov. 5, 2013

(54) WALL MOUNTED TOGGLE HOOK

(75) Inventor: Pierre McDuff, Outremont (CA)

(73) Assignee: Cobra Fixations Cie. Ltee—Cobra Anchors Co. Ltd., Montreal (CA)

( * ) Notice: Subject to any disclaimer, the term of this patent is extended or adjusted under 35 U.S.C. 154(b) by 436 days.

This patent is subject to a terminal disclaimer.

(21) Appl. No.: 12/347,242

(22) Filed: Dec. 31, 2008

(65) Prior Publication Data

US 2009/0269158 A1    Oct. 29, 2009

Related U.S. Application Data

(63) Continuation of application No. 10/548,113, filed as application No. PCT/CA2004/000311 on Mar. 4, 2004, now Pat. No. 7,547,171.

(30) Foreign Application Priority Data

Mar. 4, 2003 (CA) ...................................... 2420718

(51) Int. Cl.
*F16D 13/04* (2006.01)

(52) U.S. Cl.
USPC ................................ 411/340; 411/2; 411/401

(58) Field of Classification Search
USPC ............ 411/2–5, 340, 400, 401, 999; 29/414, 29/413, 418, 423; 52/98, 698
See application file for complete search history.

(56) References Cited

U.S. PATENT DOCUMENTS

| 1,159,420 A | 11/1915 | Rubly |
| 2,916,235 A | 12/1959 | Wilhelm Nagel |

(Continued)

FOREIGN PATENT DOCUMENTS

CA          2420718 A1    9/2004

OTHER PUBLICATIONS

International Search Report for PCT/CA2004/000311 mailed Jul. 14, 2004.

*Primary Examiner* — Flemming Saether
(74) *Attorney, Agent, or Firm* — Ungaretti & Harris LLP

(57) ABSTRACT

A convertible anchor (H) for friable walls (W) comprises a fixture (12) for holding an article to a wall (W, M) and an anchoring mechanism (10) extending from the fixture (12). The anchoring mechanism (10) is adapted when rotated to engagingly extend into a friable wall (W) for securing the fixture (12) to the wail (W). The fixture (12) is selectively separable via frangible connection elements (14, 24) from the anchoring mechanism (10) for allowing the fixture (12) to be used alone with an appropriate fastener (S) suitable for installing the fixture (12) to a rigid structure (M), such as wooden components. The anchoring mechanism (10) can take different forms as long as it is can be mounted to a friable wall (W). Typically, a space (26) is defined between the fixture (12) and a proximal end (34) of the anchoring mechanism (10) with this space (26) being bridged by the frangible connection elements (14, 24). The fixture (12) defines an opening (16) adapted to be engaged by a screwdriver bit (B) for mounting the anchor (H) to the wall (W, M). The method calls for determining the nature of the vertical support to which the anchor (H) is to be mounted and then, for a friable wall (W), installing the anchor (H) thereto using the anchoring mechanism (10); or, for a more solid vertical support (M) such a wood, separating the fixture (12) from the anchoring mechanism (10) and installing the fixture (12) to the solid vertical support (M) via an appropriate fastener (S).

11 Claims, 7 Drawing Sheets

(56) References Cited

U.S. PATENT DOCUMENTS

| | | |
|---|---|---|
| 3,926,394 A | 12/1975 | Mauceri et al. |
| 4,274,324 A | 6/1981 | Giannuzzi |
| 4,285,264 A | 8/1981 | Einhorn |
| 4,406,108 A | 9/1983 | Beck et al. |
| 4,619,430 A | 10/1986 | Hogg |
| 5,059,077 A | 10/1991 | Schmid |
| 5,215,418 A | 6/1993 | Trainer et al. |
| 5,752,792 A | 5/1998 | McSherry |
| 5,944,295 A | 8/1999 | McSherry |
| 6,250,865 B1 | 6/2001 | McSherry |
| 7,160,074 B2 | 1/2007 | Ernst et al. |
| 7,547,171 B2 * | 6/2009 | McDuff ............ 411/400 |
| 2007/0124910 A1 | 6/2007 | Peterson et al. |

\* cited by examiner

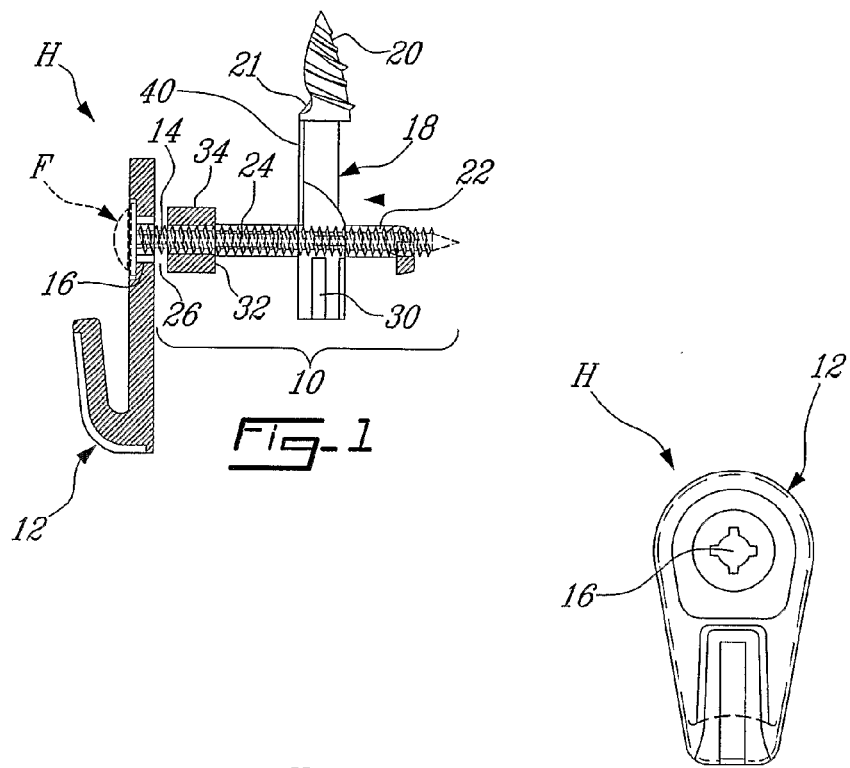
Fig-1
Fig-2
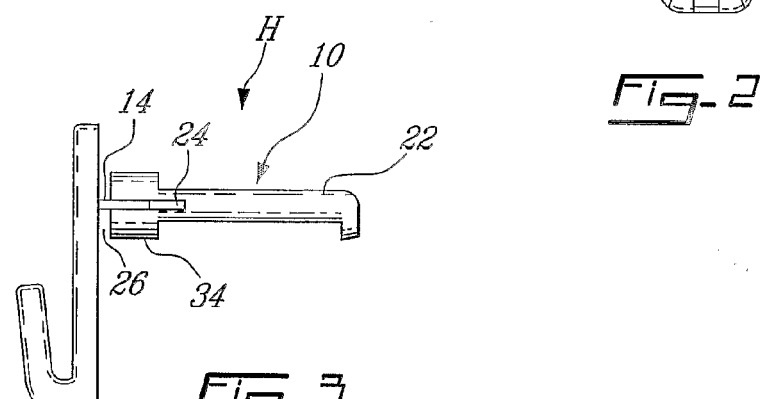
Fig-3
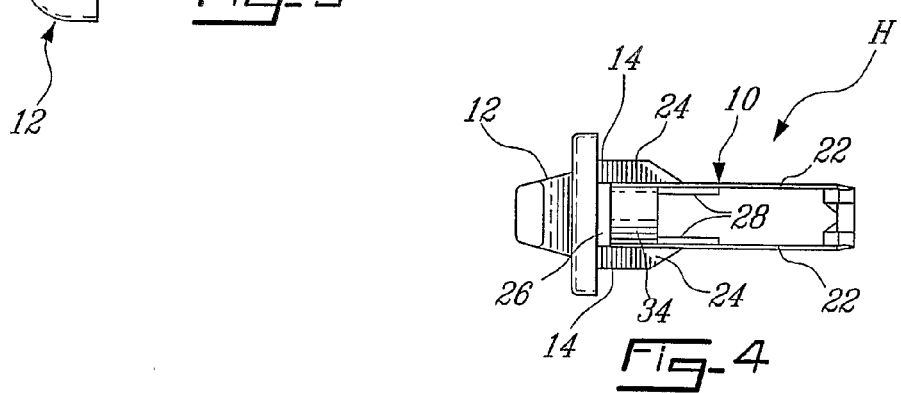
Fig-4

WALL MOUNTED TOGGLE HOOK

REFERENCE TO RELATED APPLICATIONS

This application is a Continuation Application of U.S. Ser. No. 10/548,113, filed May 2, 2006 (now U.S. Pat. No. 7,547, 171), which claims priority from PCT Application No. PCT/CA2004/000311, filed on Mar. 4, 2004, which claims priority from Canadian Application No. 2,420,718, filed on Mar. 4, 2003 (incorporated by reference herein).

BACKGROUND OF THE INVENTION

1. Field of the Invention

The present invention relates to wall fixtures and, more particularly, to a wall anchor for use in different materials including friable materials, e.g. gypsum.

2. Description of the Prior Art

There are various wall anchors available on the market, including plastic inserts which are hammered in a hole previously defined in a wall with a fastener, such as a screw, being then engaged in the plastic insert, causing it to expand such that the assembly of the insert and the fastener is set in the wall.

Toggle bolts also exist, wherein rotation of a bolt causes wings to deploy behind the wall and to ultimately abut the inside of the wall thereby firmly anchoring the bolt to the wall.

Both these types of anchors necessitate that a hole be previously drilled in the wall. On the other hand, there exists wall anchors defining a pointed cutting end and large threads, which are adapted to, in a single step, be rotatively driven in the wall thereby drilling their own hole in the wall with the large threads of the anchor compacting the gypsum and becoming firmly set therein. These types of anchors must be installed by way of a screwdriver and typically by a power driven screwdriver bit.

For instance, a screw tipped anchor with a toggle is disclosed in U.S. Pat. No. 6,250,865-B1 which issued on Jun. 26, 2001 in the name of McSherry.

Also of interest is U.S. Pat. No. 5,944,295 that issued on Aug. 31, 1999 in the name of McSherry, which discloses a pair of separate components, namely a wall anchor and a fixture. The fixture, e.g. a hook, is secured to a friable wall using the wall anchor that is inserted through a hole defined in the fixture and then rotatably driven in the wall typically via a power driven screwdriver bit.

SUMMARY OF THE INVENTION

It is therefore an aim of the present invention to provide a novel wall anchor of simple installation and that can be installed in friable walls as well as in solid structural members.

Therefore, in accordance with the present invention, there is provided a convertible anchor for friable walls, comprising a fixture for holding an article to a substantially vertical support and anchoring means extending from said fixture, said anchoring means being adapted when rotated to engagingly extend into a friable wall for securing said fixture to the wall, said fixture being selectively separable from said anchoring means for allowing said fixture to be used alone with an appropriate fastener that firmly mounts said fixture to a rigid structure.

A frangible connection is provided between said fixture and said anchoring means, said frangible connection being sufficiently solid to allow the assembly of said fixture and said anchoring means to be rotatably installed to the friable wall while being adapted to be selectively broken for separating said fixture from said anchoring means.

Said anchoring means can comprise a threaded anchor member configured and sized for firmly being engageable in the friable wall. Typically, a space is defined between said fixture and a proximal end of said threaded anchor member. Generally, said space is bridged by said frangible connection.

Alternatively, said anchoring means comprises a toggle support extending from said fixture and being frangibly connected thereto, a toggle bolt pivotally mounted to said toggle support between a first and second position, and a fastener, wherein in said first position said toggle bolt is substantially parallel to said toggle support to allow said anchoring means to be engaged in the friable wall, whereas in said second position said toggle bolt is substantially transversal to said toggle support, said fastener being adapted when introduced along said toggle support to cause said toggle bolt to displace from said first to said second position and to then threadably engage said toggle bolt for drawing said toggle bolt towards said fixture and against a non visible side of the friable wall thereby securing said anchor to the friable wall.

Said fastener can be used to mount said fixture to the rigid structure once said anchoring means including said toggle support and said toggle bolt have been detached from said fixture by rupturing said frangible connection.

For instance, said frangible connection comprises a pair of parallel elements extending parallelly to said toggle support and connecting a proximal end of said toggle support to said fixture.

Said parallel elements, if extending outwardly of said proximal end of said toggle support, may be adapted when translationally inserted in the friable wall to set said anchor in a desired position in the friable wall and oppose a rotation of said anchor in the wall friable wall.

A space may be conveniently defined between said fixture and said proximal end of said toggle support, said space being bridged by said parallel elements.

Typically, said fixture defines an opening adapted to be engaged by a screwdriver bit for mounting said anchor to the friable wall.

Generally, said toggle bolt is provided with a leading screw tip for engaging, when said toggle bolt is in said first position thereof, the friable wall as said anchor being installed thereto.

Also in accordance with the present invention, there is provided a method for installing a wall anchor into one or the other of a friable wall and a rigid structure, comprising the steps of:

(a) providing a convertible wall anchor having a fixture adapted to hold an article to a substantially vertical support and anchoring means extending from said fixture and adapted for mounting to a friable wall for securing said fixture to the wall, said fixture being selectively separable from said anchoring means;

(b) determining a nature of the vertical support and proceeding with step (c1) in the event that the vertical support is a friable wall or with step (c2) in the event that the vertical support is a rigid structure unsuited to be penetrated by said anchoring means; and (c1) mounting said convertible anchor to the friable wall with said fixture being on a visible side of the friable wall, or (c2) separating said fixture from said anchoring means and installing said fixture to the rigid structure via a fastener suitable for insertion into the rigid structure.

Typically, at least when the rigid structure is wood-based, said fastener in step (c2) is a screw.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a cross-sectional side elevational view of a wall mounted toggle hook in accordance with the present invention, showing a toggle member of the hook engaged by a screw;

FIG. 2 is a front elevational view of the wall mounted toggle hook of FIG. 1 but without the toggle member;

FIG. 3 is a side elevational view of the wall mounted toggle hook of FIG. 1 but without the toggle member;

FIG. 4 is a top plan view of the wall mounted toggle hook of FIG. 1 but without the toggle member;

DESCRIPTION OF THE PREFERRED EMBODIMENTS

FIGS. 1 to 8 illustrate a wall mounted toggle hook H in accordance with the present invention, with a fastener F, such as a screw, being shown in FIGS. 1 and 5 to 8. The toggle hook H comprises a screw tipped anchor 10 that is, for instance similar to that of the anchor assembly of aforementioned U.S. Pat. No. 6,250,865-B1 (which is herein incorporated by reference), but without the proximal flange thereof (that is engaged by the screwdriver bit to rotatably install the anchor assembly in a friable wall). In the present hook H, such a flange is replaced by a hook fixture 12 that is similar to the hook fixture 20 of aforementioned U.S. Pat. No. 5,944,295.

Figure 9A:
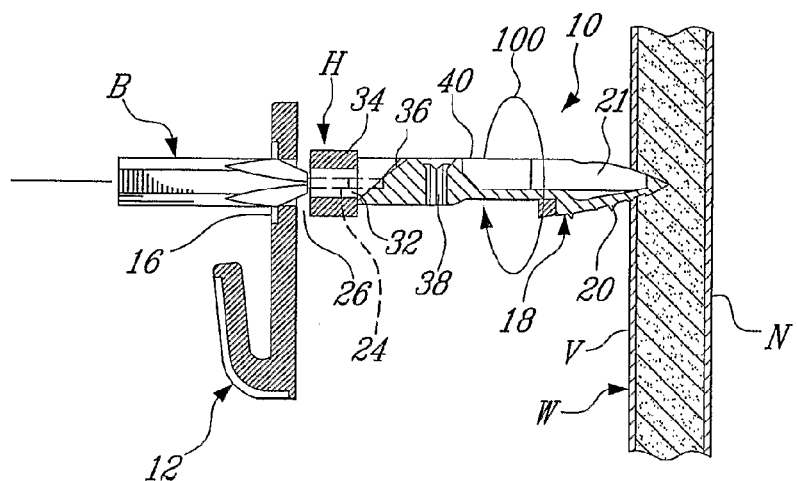
FIGS. 9A to 9E are sequential cross-sectional side views showing the installation of the toggle hook of FIG. 1 in a hollow wall using the screw.
Figure 10:
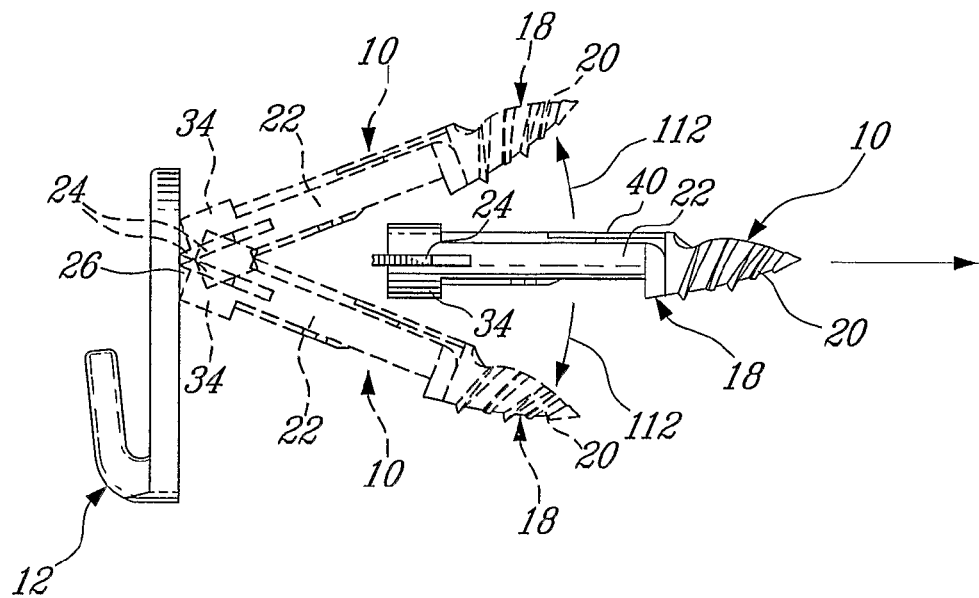
FIG. 10 is a side view showing the toggle hook of FIG. 1 being separated in two so as to detach the toggle member thereof from a hook fixture of the toggle hook.

The anchor 10 and the hook fixture 12 are herein frangibly connected at 14 such that the anchor 10 can be snapped off (as seen in FIG. 10), e.g. via pliers, from the hook fixture 12 when it is desired to install the hook fixture 12 to a hard member, such as a wooden structural component, e.g. a 2"×4". Indeed, the hook H is generally intended for hollow walls W made of friable material (e.g. gypsum walls), wherein a cruciform opening 16 defined in the hook fixture 12 is engaged by a manually driven or power driven screwdriver bit B (see FIG. 9A) such that rotation of the bit B causes the whole hook H to rotate along arrow 100 in FIG. 9A, with the anchor 10 thereof boring an opening O in the wall W.

More particularly, the anchor 10 includes a pivotable toggle bolt 18 provided with a screw tip 20 that is partly opened to define a cavity 21. The toggle bolt 18 is pivotally mounted to a pair of fixed parallel posts 22 of the anchor 10. A pair of parallel blades 24 (also called anti-rotation tabs) are provided between the hook fixture 12 and the posts 22 so as to frangibly connect the hook fixture 12 to the anchor 10. The blades 24 are sufficiently strongly connected to the hook fixture 12 and to the anchor 10 to allow the toggle hook H to be engaged in and mounted to the friable wall W, as shown in FIGS. 9A to 9E, but will, when sufficient force is applied, yield and so allow the hook fixture 12 to be removed from the anchor 10 for use with the fastener F to mount the hook fixture 12 only (i.e. without the anchor 10) to a hard structural component.

Figure 5:
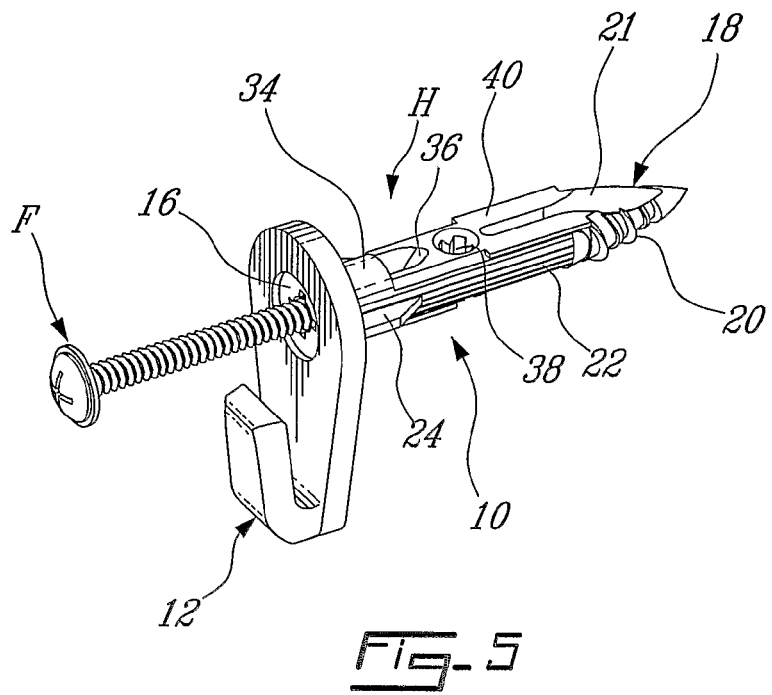
FIG. 5 is a front perspective view of the wall mounted toggle hook of FIG. 1 with the screw, in a first position thereof, partly inserted therein.
Figure 6:
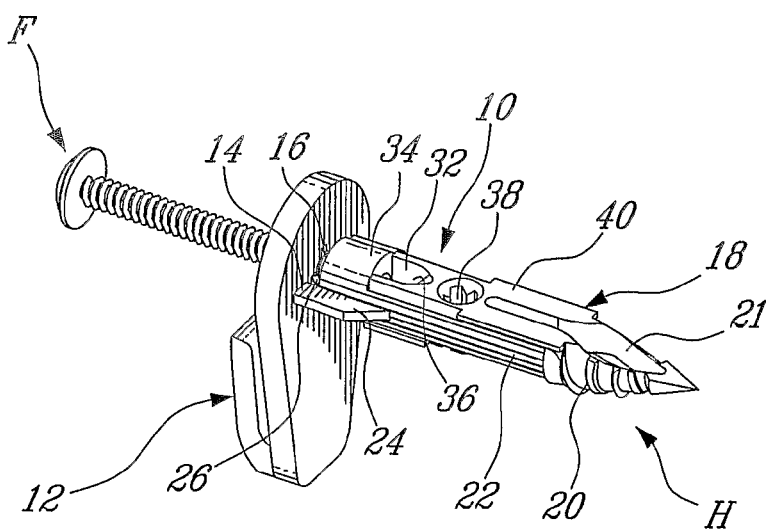
FIG. 6 is a rear perspective view of the wall mounted toggle hook and screw assembly of FIG. 5.
Figure 7:
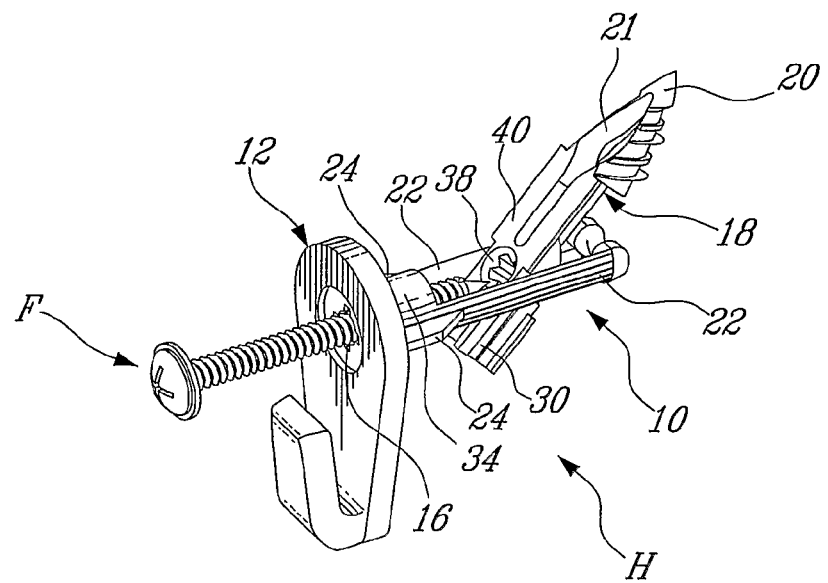
FIG. 7 is a front perspective view of the wall mounted toggle hook of FIG. 1 with the screw, in a second position thereof, further inserted therein and causing a pivot of the toggle member.
Figure 8:
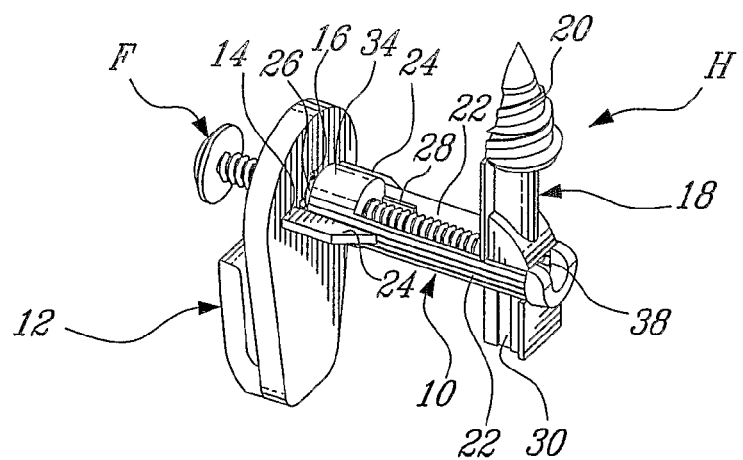
FIG. 8 is a rear perspective view of the wall mounted toggle hook of FIG. 1 with the screw, in a third position thereof, being engaged in the toggle member.

Returning to the use of toggle hook H in a friable wall W, when the anchor 10 is rotatably driven into the wall W, the toggle bolt 18 is parallel to the posts 22 as seen in FIGS. 5 and 9A, whereby the screw tip 20 drills the opening O in the wall W. In this first position of the toggle bolt 18, the toggle bolt 18 is retained in alignment parallel between the two posts 22 by the engagement of a pair of ridges 28 (FIGS. 4 and 8) provided along inside surfaces of the posts 22 with a pair of channels 30 (FIGS. 1 and 8) defined on outside surfaces of the toggle bolt 18.

Figure 9B:
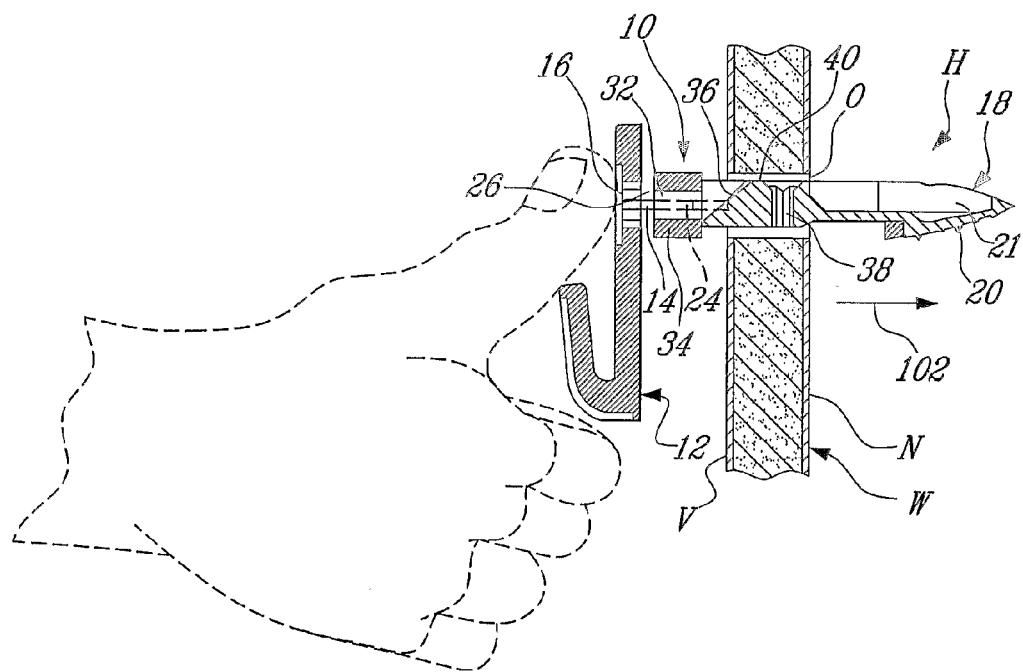

Once the opening O has been drilled but before the blades 24 engage the wall W, rotation of the hook H by the screwdriver bit B is interrupted, i.e. at the position of the toggle hook H illustrated in FIG. 9B.

The toggle hook H is positioned, either using the bit B or by manually rotating the hook fixture 12, such that the hook fixture 12 is in its vertical orientation shown in FIGS. 1 to 3 and 9B. The toggle hook H is thereafter pushed translationally straight towards the wall W, along arrow 102 as seen in FIG. 9B, such that the blades 24 cut into the friable wall W thereby setting the hook H and its hook fixture 12 in the desired position.

The fastener F (see FIG. 9C) is then inserted rotatably and or translationally in the hook H using again the screwdriver bit B inserted in the hook H, or manually by translationally inserting the fastener F in the hook H. In fact, the fastener F must translationally advance along arrow 104 through the cruciform opening 16 defined in the hook fixture 12 and through the hole 32 defined in a cylindrical member 34 that connects the posts 22 to the blades 24. In fact, the posts 22 and the cylindrical member 34 are integral and form a toggle support for the toggle bolt 18.

The advancement of the fastener F will cause the toggle member 18 to longitudinally displace in a same direction and along the posts 22. Once the ridges o28 of the posts 22 become disengaged from the channels 30 of the toggle bolt 18, a further advancement of the fastener F will cause the toggle bolt 18 to pivot along arrow 106 (FIG. 9C) as the tip of the fastener F travels along a sloped proximal portion 36 (see FIGS. 5 and 9A to 9E) of the toggle bolt 18. The fastener F thus causes the toggle bolt 18 to pivot from its original position parallel to the posts 22 to a transversal position thereof shown in FIGS. 1 and 9D.

Figure 9C:
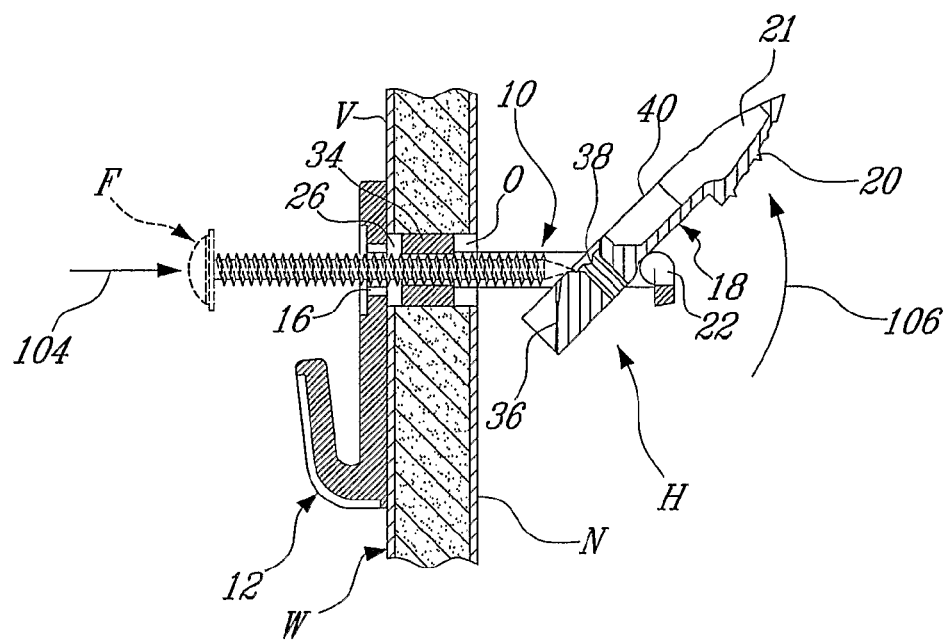
Figure 9D:
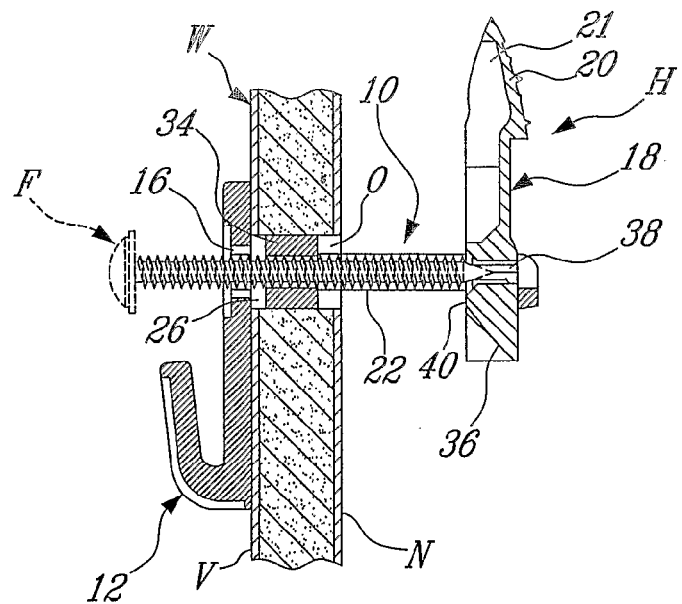

As seen in FIGS. 9C and 9D, the toggle bolt 18 is configured such that the fastener F, which is driven by a screwdriver bit (not shown), then threadably engages (and taps) a cruciform opening 38 (see FIGS. 5 to 7 and 9A to 9E) defined in the toggle bolt 18.

Figure 9E:
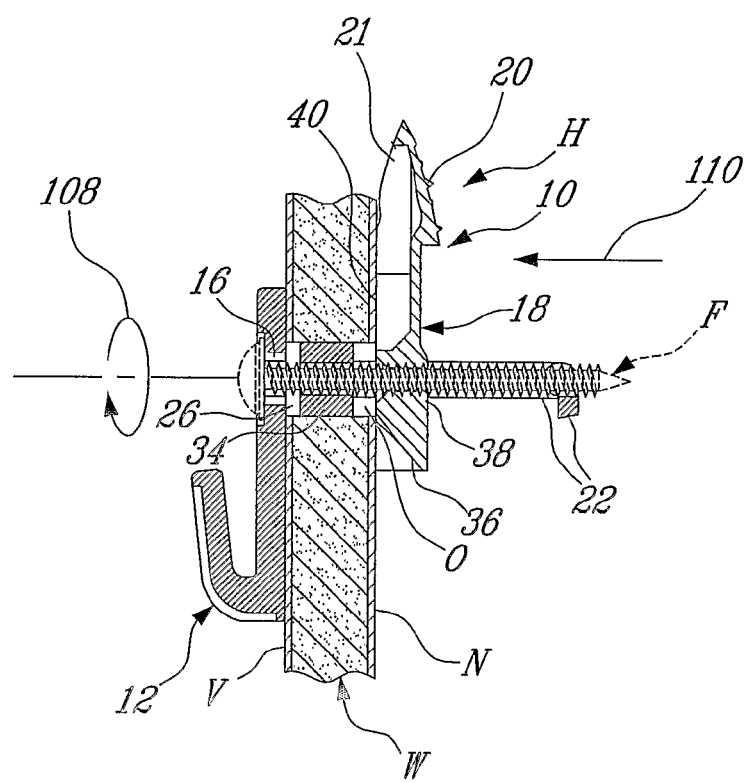

As illustrated in FIG. 9E, once the fastener F is prevented from further translational advancement, for instance as a result of its head abutting the hook fixture 12, further rotation of the fastener F along arrow 108 will gradually draw the transversally-oriented toggle bolt 18 translationally along the posts 22, as per arrow 110, until a plane surface 40 of the toggle bolt 18 firmly engages a non visible surface N of the wall W, whereat the hook fixture 12 is held strongly against a visible surface V of the wall W, with the hook H being strongly mounted to the wall W as the wall W is imprisoned between the toggle bolt 18 and the hook fixture 12.

Figure 11:
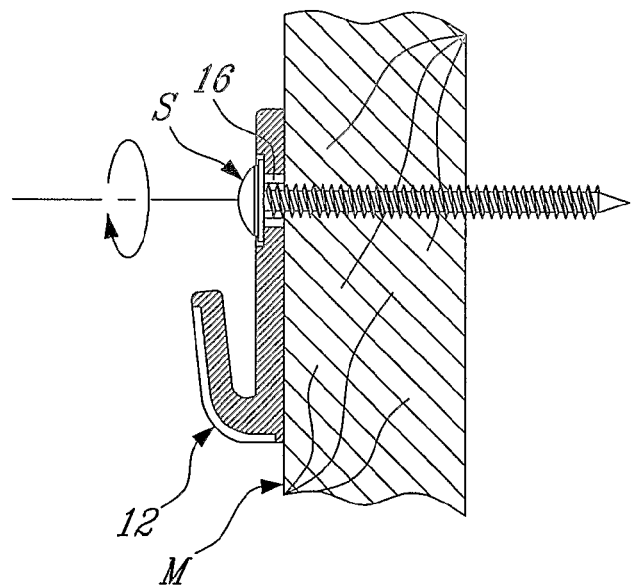
FIG. 11 is a cross-sectional side view showing the hook fixture, devoid of the toggle member of the toggle hook following its removal as per FIG. 10, mounted with a screw to a wooden structural member.

If one wishes to install the hook fixture 12 to a rigid structure instead of to the friable wall W, the anchor 10 can be bent with respect to the hook fixture 12 such as to snap off therefrom at frangible connections 14 as seen in FIG. 10, i.e. at the proximal ends of the blades 24, between which there is defined a space 26. The space 26 allows for the back-and-forth bending along arrows 112 of the anchor 10 relative to the hook fixture 12, as illustrated in phantom lines in FIG. 10. The anchor 10 is then discarded and the remaining hook fixture 12 can be secured to the rigid structure using an appropriate fastener, such as a wood screw S when the hook fixture 12 is installed to a wooden structural member M, e.g. a 2"×4", as seen in FIG. 11.

Other anchoring members (i.e. instead of the toggle anchor 10 illustrated herein) can be contemplated, as long as they are frangibly connected to the visible fixture (herein shown as hook fixture 12) and as long as they are suited to friable walls. For instance, the wall anchor disclosed in aforementioned U.S. Pat. No. 5,944,295 (that is used to secure a hook to a wall) could be adapted by removing its proximal head and by then being frangibly connected to a wall fixture such as the present hook fixture 12. In such a case, there would be no toggle bolt and generally no fastener, but simply a wall anchor suitable for friable walls that would be installed with its attached fixture via a screwdriver bit and as per a single step similar to that illustrated herein in FIG. 9A. If the fixture needs to be installed to a rigid structural component, the wall anchor would be snapped off from the fixture and the fixture alone would be mounted to such a rigid structural component via a threaded fastener, e.g. a screw, in a manner similar to that illustrated in FIG. 11.

The invention claimed is:

1. A convertible anchor for friable walls, comprising a fixture for holding an article to a support and an anchor being connected to and extending from said fixture in a first position of said fixture, wherein in said first position said anchor is adapted when rotated about a longitudinal axis thereof to engagingly extend into a friable wall for securing said fixture to the wall, and wherein said fixture is selectively separable from said anchor for allowing said fixture in a second position thereof to be used alone with an appropriate fastener that mounts said fixture to a rigid structure, wherein a frangible connection is provided between said fixture and said anchor, said frangible connection being adapted to allow in said first position the assembly of said fixture and said anchor to be rotatably installed to the friable wall while being adapted to be selectively broken for separating said fixture from said anchoring means.

2. A convertible anchor as defined in claim 1, wherein said anchor is configured and sized for firmly being engageable in the friable wall, and wherein a fastener is adapted to be inserted through the fixture when in said second position and for engaging said anchor on a non visible side of the friable wall, a head of said fastener being adapted to abut said fixture once said fastener has been sufficiently inserted in the wall.

3. A convertible anchor as defined in claim 1, wherein said anchor comprises a toggle support extending from said fixture and being frangibly connected thereto, a toggle bolt pivotally mounted to said toggle support between a first and second position, and a fastener, wherein in said first position said toggle bolt is substantially parallel to said toggle support to allow said anchor to be engaged in the friable wall, whereas in said second position said toggle bolt is substantially transversal to said toggle support, said fastener being adapted when introduced along said toggle support to cause said toggle bolt to displace from said first to second position and to then threadably engage said toggle bolt for drawing said toggle bolt towards said fixture and against a non visible side of the friable wall thereby securing said anchor to the friable wall.

4. A convertible anchor as defined in claim 3, wherein said toggle bolt is provided with a leading screw tip for engaging, when said toggle bolt is in said first position thereof, the friable wall as said anchor is being installed thereto.

5. A convertible anchor as defined in claim 1, wherein a fastener is provided to mount said fixture to the rigid structure once said anchor has been detached from said fixture by rupturing said frangible connection and said fixture is in said second position.

6. A convertible anchor as defined in claim 1, wherein said frangible connection comprises a pair of parallel elements extending parallelly to said anchor and connecting a proximal end of said anchor to said fixture.

7. A convertible anchor as defined in claim 6, wherein said parallel elements extend outwardly of said proximal end of said anchor and are adapted when translationally inserted in the friable wall to set said anchor in a desired position in the friable wall and oppose a rotation of said anchor in the wall friable wall.

8. A convertible anchor as defined in claim 6, wherein a space is defined between said fixture and said proximal end of said anchor, said space being bridged by said parallel elements.

9. A convertible anchor as defined in claim 1, wherein said fixture defines an opening adapted to be engaged by a screwdriver bit for mounting said anchor to the friable wall.

10. A convertible anchor as defined in claim 1, wherein a space is defined between said fixture and a proximal end of said anchor, and wherein said fixture is located proximally of said space, whereas said proximal end of said anchor is located distally of said space, whereby said space is at least partly located in the wall when said anchor is installed in the wall.

11. A convertible anchor as defined in claim 10, wherein said space is bridged by said frangible connection.

* * * * *

UNITED STATES PATENT AND TRADEMARK OFFICE
CERTIFICATE OF CORRECTION

PATENT NO.        : 8,573,913 B2                                    Page 1 of 1
APPLICATION NO.   : 12/347242
DATED             : November 5, 2013
INVENTOR(S)       : Pierre McDuff It is certified that error appears in the above-identified patent and that said Letters Patent is hereby corrected as shown below:

On the title page item (57), Column 2 (Abstract), line 6, delete "wail" and insert -- wall -- therefor;

On the title page item (57), Column 2 (Abstract), line 12, delete "is" before "can";

In the Claims:

Column 6, Line 38, delete "wall" after "anchor in the".

Signed and Sealed this
Twenty-second Day of April, 2014

Michelle K. Lee
*Deputy Director of the United States Patent and Trademark Office*